United States Patent
Edgeller et al.

(10) Patent No.: US 8,840,129 B2
(45) Date of Patent: Sep. 23, 2014

(54) MECHANISM FOR AUTOMATICALLY LIFTING A TRAILER DRAWBAR SUPPORT

(71) Applicant: Clark Equipment Company, Statesville, NC (US)

(72) Inventors: Peter Edgeller, Southport (GB); Craig Buxton, Leigh (GB)

(73) Assignee: Clark Equipment Company, Statesville, NC (US)

( * ) Notice: Subject to any disclaimer, the term of this patent is extended or adjusted under 35 U.S.C. 154(b) by 0 days.

(21) Appl. No.: 13/834,712

(22) Filed: Mar. 15, 2013

(65) Prior Publication Data
US 2014/0035258 A1 Feb. 6, 2014

Related U.S. Application Data

(60) Provisional application No. 61/677,761, filed on Jul. 31, 2012.

(51) Int. Cl.
*B60D 1/66* (2006.01)
*B60S 9/02* (2006.01)
*B60D 1/155* (2006.01)
*B60S 9/18* (2006.01)

(52) U.S. Cl.
CPC ............... *B60D 1/665* (2013.01); *B60D 1/155* (2013.01); *B60S 9/18* (2013.01)
USPC ............. 280/475; 254/420; 280/46; 280/430; 280/431; 280/446.1; 280/763.1

(58) Field of Classification Search
CPC .................. B60D 1/66; B60D 1/665
USPC ............. 254/420; 280/46, 414.5, 446.1, 475, 280/477, 490.1, 656, 763.1, 764.1, 765.1, 280/766.1, 767, 429, 430, 431
See application file for complete search history.

(56) References Cited

U.S. PATENT DOCUMENTS 2,446,321 A * 8/1948 Bartholomew ............... 280/475
2,627,424 A * 2/1953 Chapin ....................... 280/763.1
(Continued)

FOREIGN PATENT DOCUMENTS

AU           572973 B2    12/1985
DE    202009011491 U1     1/2011
(Continued)

OTHER PUBLICATIONS

Al-Ko RV Jockey Wheels, known and accessible to the public at least prior to Jul. 31, 2011, retrieved from the internet at: http://www.trailerpartsonline.co.nz/jockeyjacks.aspx, 4 pages.

(Continued)

*Primary Examiner* — Joseph M Rocca
*Assistant Examiner* — Marc A Scharich
(74) *Attorney, Agent, or Firm* — Michael Best & Friedrich LLP (57) ABSTRACT

A trailer adapted to be coupled to a tow vehicle and including a frame including a draw bar tube defining a longitudinal axis. The trailer includes a drawbar support pivotally coupled to the draw bar tube and rotatable relative to the drawbar tube about an axis parallel to the longitudinal axis. The drawbar support is biased toward a substantially horizontal orientation. A sliding member is receivable in the drawbar tube and is configured for movement along the longitudinal axis in response to movement of the tow vehicle. A latch member is connected to the sliding member. The latch member is configured to move in response to movement of the sliding member from a first position wherein the drawbar support is retained in a substantially vertical orientation to a second position wherein the draw bar support is free to rotate toward the substantially horizontal orientation.

16 Claims, 10 Drawing Sheets

(56) References Cited

U.S. PATENT DOCUMENTS

| | | | |
|---|---|---|---|
| 2,853,316 A * | 9/1958 | Moss | 280/475 |
| 2,882,070 A * | 4/1959 | Bill | 280/475 |
| 3,902,733 A | 9/1975 | David | |
| 4,162,798 A * | 7/1979 | Foley | 280/475 |
| 6,511,279 B1 * | 1/2003 | Harkcom et al. | 414/537 |
| 8,042,825 B2 | 10/2011 | Jamieson | |
| 8,220,833 B2 * | 7/2012 | Van Der Plaats et al. | 280/763.1 |
| 2009/0236578 A1 * | 9/2009 | Nirenberg et al. | 254/420 |
| 2010/0117038 A1 * | 5/2010 | Pinnell et al. | 254/420 |
| 2012/0261903 A1 * | 10/2012 | Arakelian | 280/476.1 |

FOREIGN PATENT DOCUMENTS

| | | |
|---|---|---|
| DE | 202011101120 | 12/2011 |
| EP | 0016847 | 10/1980 |
| EP | 1806245 | 4/2009 |
| GB | 896622 A | 5/1962 |
| GB | 2008647 | 6/1979 |
| GB | 2363766 | 1/2002 |
| GB | 2358009 | 4/2003 |
| GB | 2387582 | 10/2003 |
| GB | 2419575 | 5/2006 |
| GB | 2457426 | 8/2009 |

OTHER PUBLICATIONS

Knott trailer chassis overrun device, Type KR13/82, known and accessible to the public at least prior to Jul. 31, 2011, retrieved from the internet at: http://www.knott-trailer-shop.com/product_info.php/cPath/35_33/products_id/47/category/overrun_device_tube_detachable/product/kr_kv_removable_permissible_total_weight_750_3500kg.htm, 5 pages.

Ingersoll Rand Parts Manual 7/41, C.C.N. 46553193, published Feb. 2010, 68 pages, see pp. 1-5.

Extended European Search Report for European Patent Application No. 13175396, dated Nov. 21, 2013. 5 pages.

* cited by examiner

MECHANISM FOR AUTOMATICALLY LIFTING A TRAILER DRAWBAR SUPPORT

BACKGROUND

The present invention relates to a mechanism for automatically lifting a trailer drawbar support, specifically, for automatically lifting a trailer drawbar support into a transit position upon movement of a towing vehicle.

A trailer drawbar support, also known as a jockey wheel, supports the front of a trailer and aids in both positioning the trailer for connection to the tow vehicle and maneuvering the trailer when not attached to the tow vehicle. A typical tubular jockey wheel body is usually secured to the trailer drawbar by a clamp, which provides coarse height adjustment, and further includes an internal screw for fine height adjustment. Once connected to a tow vehicle, an operator manually retracts the jockey wheel to avoid ground contact using either or both of the coarse and fine adjustments so the trailer can be towed. If absently left in the "lowered" position, the jockey wheel can be damaged by ground impact when the towed trailer moves forward or rearward.

SUMMARY

In one embodiment, the invention provides a device for lifting a drawbar support of a trailer for a vehicle. The trailer includes a frame and a drawbar tube defining a longitudinal axis. The device includes a sliding member receivable in the tube and is configured for movement along the longitudinal axis in response to movement of the vehicle. The trailer also includes a body fixedly secured to the drawbar tube. A back plate is pivotally coupled to the body and is rotatable relative to the body about an axis parallel to the longitudinal axis. The back plate is biased toward a first position. A mounting device is secured to the back plate and is configured to operatively couple the drawbar support to the back plate. A latch member is connected to the sliding member and is pivotally coupled to the body. The latch member is configured to rotate in response to movement of the sliding member from an engaged position wherein the back plate is retained in a substantially vertical second position to a disengaged position wherein the back plate is free to rotate to the first position.

In another embodiment, the invention provides a trailer adapted to be coupled to a tow vehicle and having a frame including a drawbar tube defining a longitudinal axis. The trailer includes a drawbar support pivotally coupled to the drawbar tube and rotatable relative to the tube about an axis parallel to the longitudinal axis. The drawbar support is biased toward a substantially horizontal orientation. A sliding member is receivable in the tube and is configured for movement along the longitudinal axis in response to movement of the tow vehicle. A latch member is connected to the sliding member. The latch member is configured to move in response to movement of the sliding member from a first position wherein the drawbar support is retained in a substantially vertical orientation to a second position wherein the drawbar support is free to rotate toward the substantially horizontal orientation.

In yet another embodiment, the invention provides a method for automatically moving a drawbar support of a trailer for a vehicle from an operable position to a stowed position. The trailer includes a frame having a drawbar tube defining a longitudinal axis. The method includes moving a sliding member in the drawbar tube along the longitudinal axis in response to an initial forward or rearward movement of the vehicle. The sliding member is operatively coupled to the drawbar support. The method further includes moving the drawbar support from the operable position to the stowed position in direct response to the movement of the sliding member.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. And as used herein and in the appended claims, the terms "upper", "lower", "top", "bottom", "front", "back", and other directional terms are not intended to require any particular orientation, but are instead used for purposes of description only.

Figure 1:
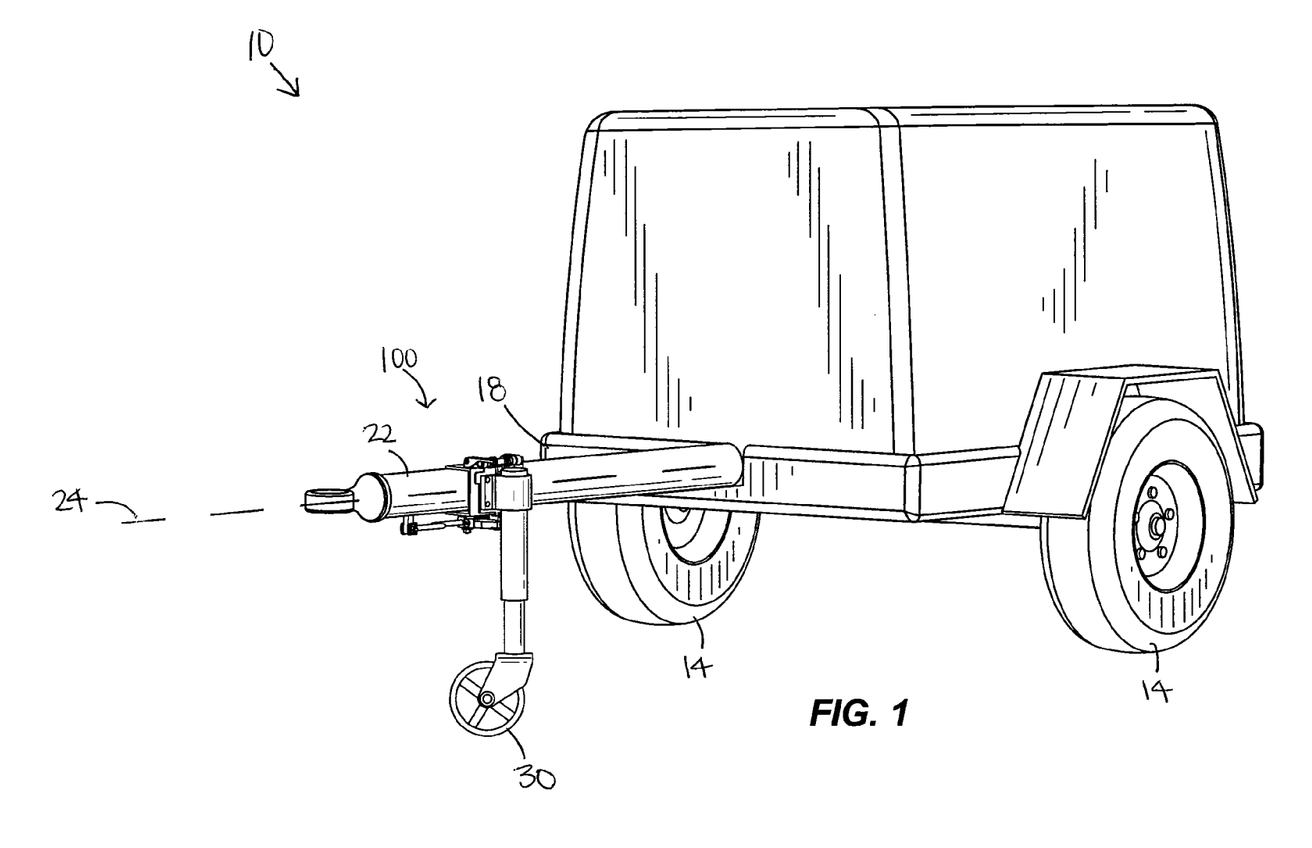
FIG. 1 is a perspective view of a trailer having a drawbar support coupled to an automatic lift mechanism.

FIG. 1 illustrates a trailer 10, which for purposes of the invention can be any trailer towed by a vehicle and is not limited in use or application. The trailer 10 includes wheels 14 and a frame 18 having a drawbar tube 22 that defines a longitudinal axis 24. A jockey wheel 30 is coupled to an automatic lift mechanism 100 configured for coupling to the towing vehicle (not shown). The frame 18 geometry need not be as illustrated and can take a number of forms and geometries that cooperate with a drawbar tube 22. As an example, a drawbar tube 22 can be coupled to the "A" of an A-frame portion of a trailer 10 (not shown) for operation as herein described.

Figure 2:
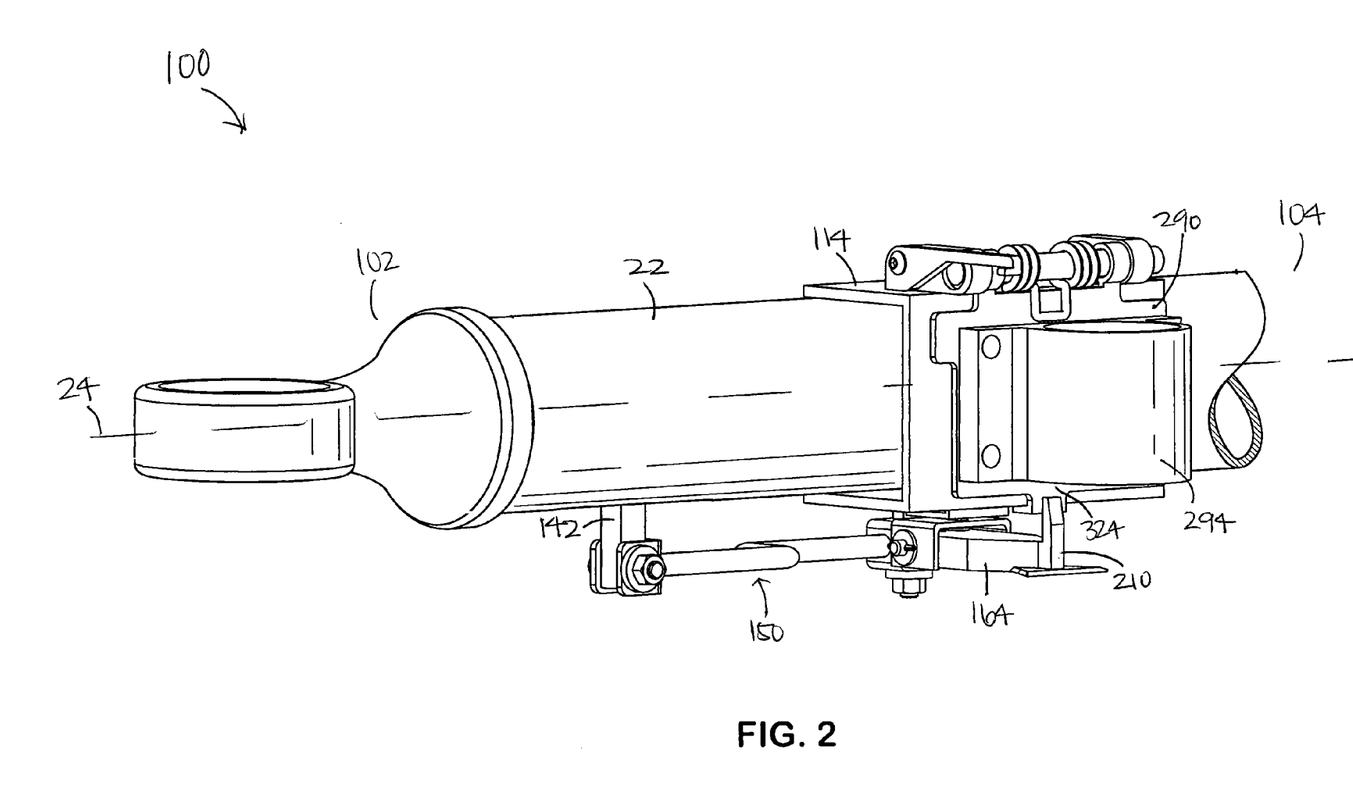
FIG. 2 is a perspective view of an automatic lift mechanism coupled to a trailer frame according to one embodiment of the invention.
Figure 3:
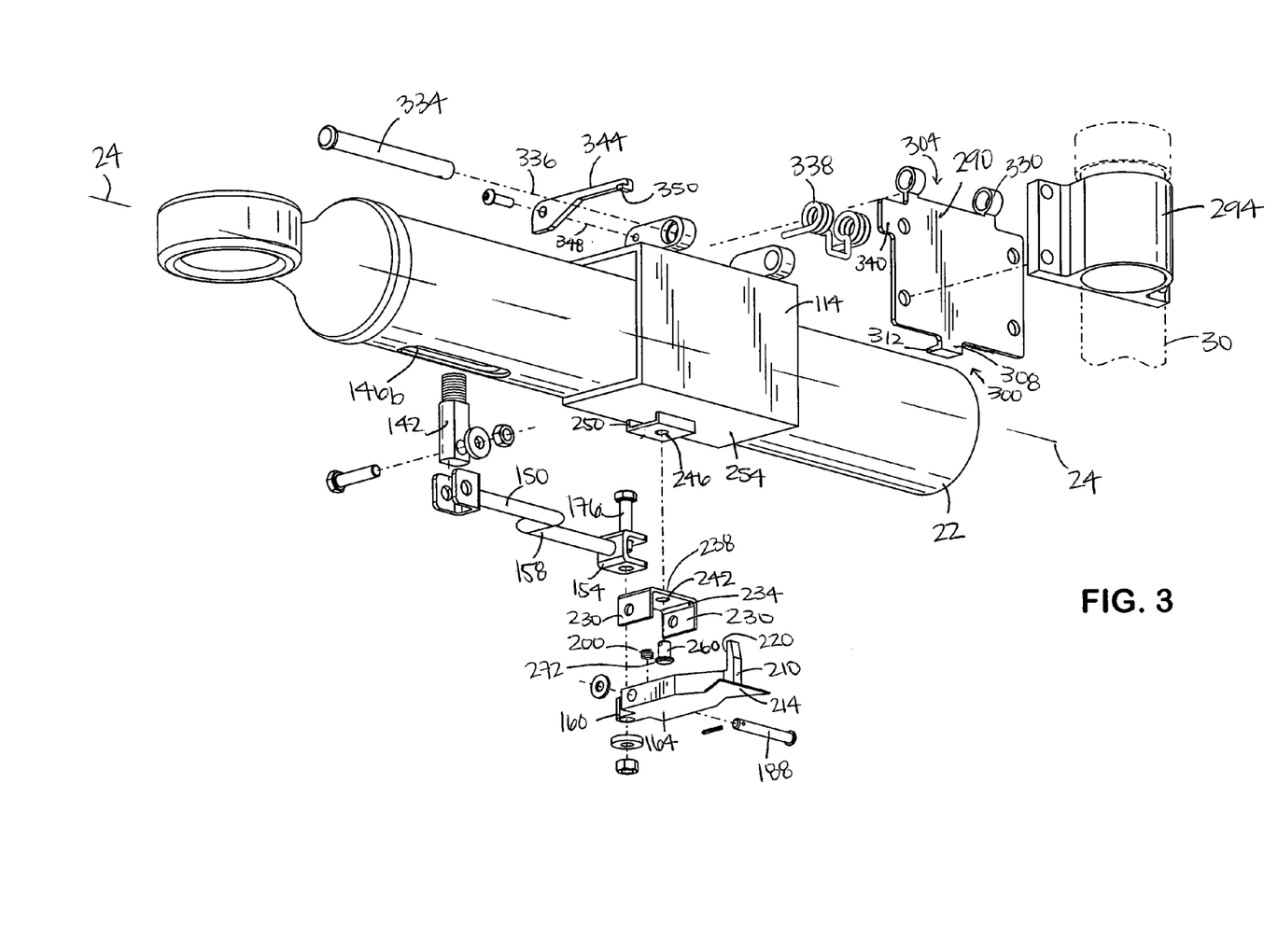
FIG. 3 is an exploded view of the automatic lift mechanism of FIG. 2.
Figure 4:
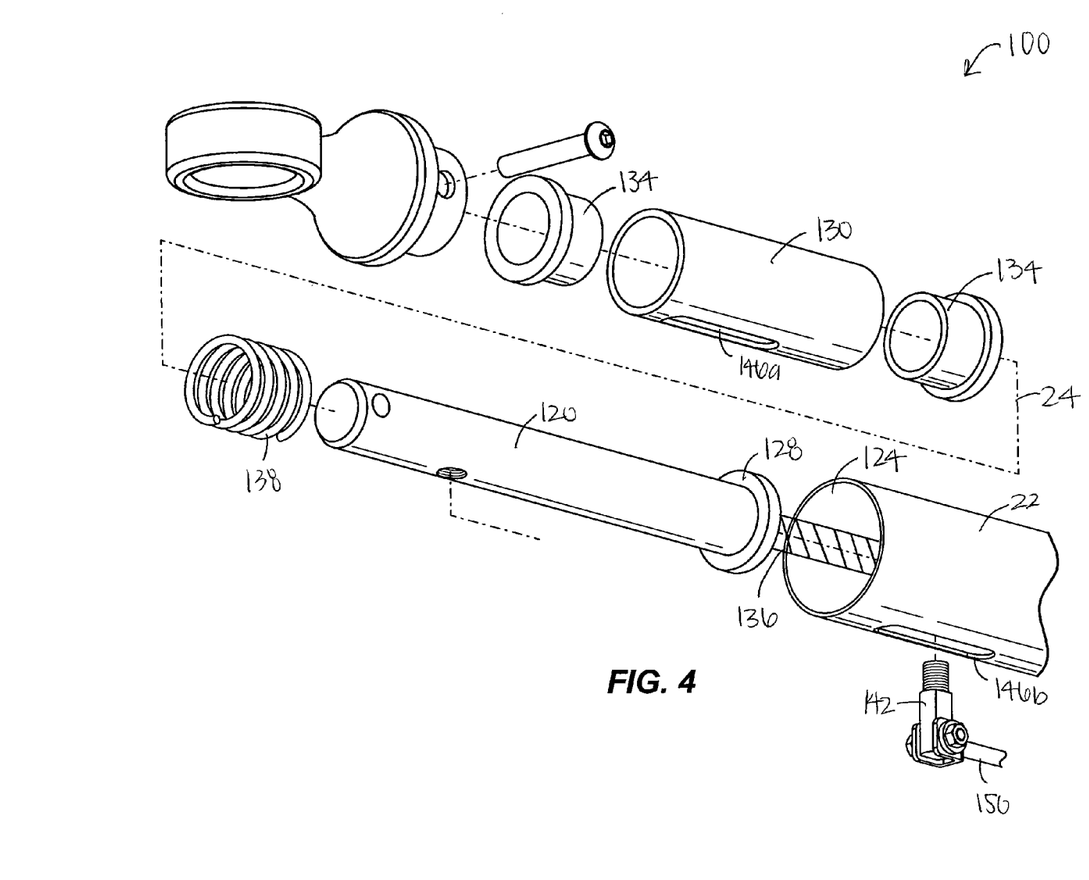
FIG. 4 is perspective view of a portion of the automatic lift mechanism of FIG. 2.
Figure 5:
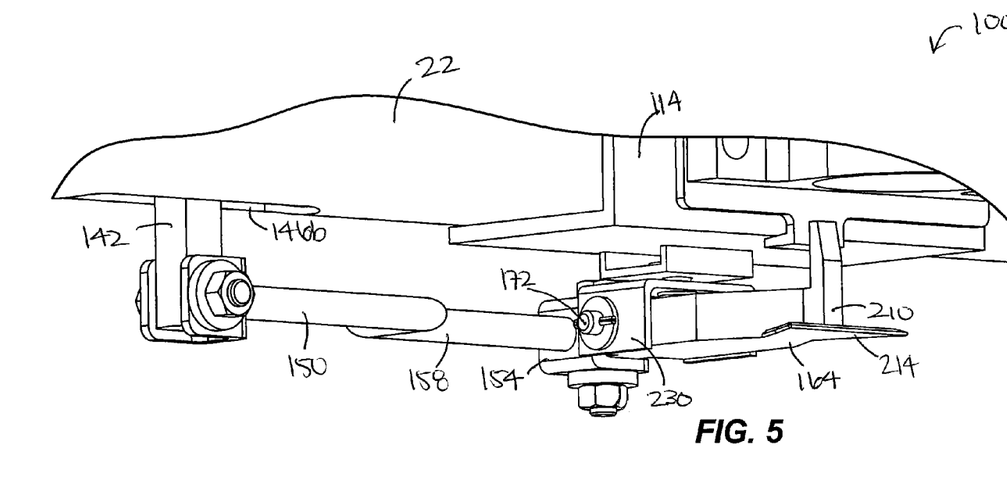
FIG. 5 is a front perspective view of a portion of the automatic lift mechanism of FIG. 2.

FIGS. 2-4 show the lift mechanism 100 referenced with respect to a proximal end 102 and a distal end 104. The automatic lift mechanism 100 includes a lifting mechanism body 114, which is coupled to an exterior surface of the drawbar tube 22. In other applications, the body 114 can be coupled to another portion of the frame 18. For example, the body 114 can alternatively be secured adjacent to the drawbar tube 22 on an angled frame member of an A-frame portion of a trailer 10. Referring to FIG. 4, the drawbar tube 22 is formed to receive a sliding member 120 through a proximal opening 124. A slide bearing support 130 disposed within the tube 22 positions proximal and distal slide bearings 134 to support and facilitate axial movement of the sliding member 120 within the tube 22. The sliding member 120 includes a flat plate or flange 128 sized for retaining the sliding member 120 within the drawbar tube 22. A hydraulic damper 136 extends longitudinally along the axis 24 through the sliding member 120 and is operably coupled thereto. A linear spring 138 biases the flange 128 from the distal slide bearing 134.

Figure 6:
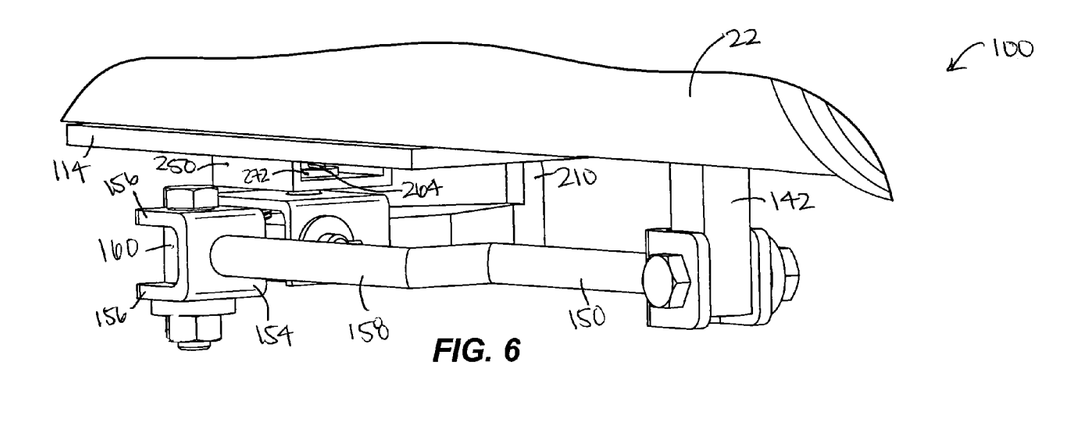
FIG. 6 is another front perspective view of the portion of the automatic lift mechanism of FIG. 5.
Figure 7:
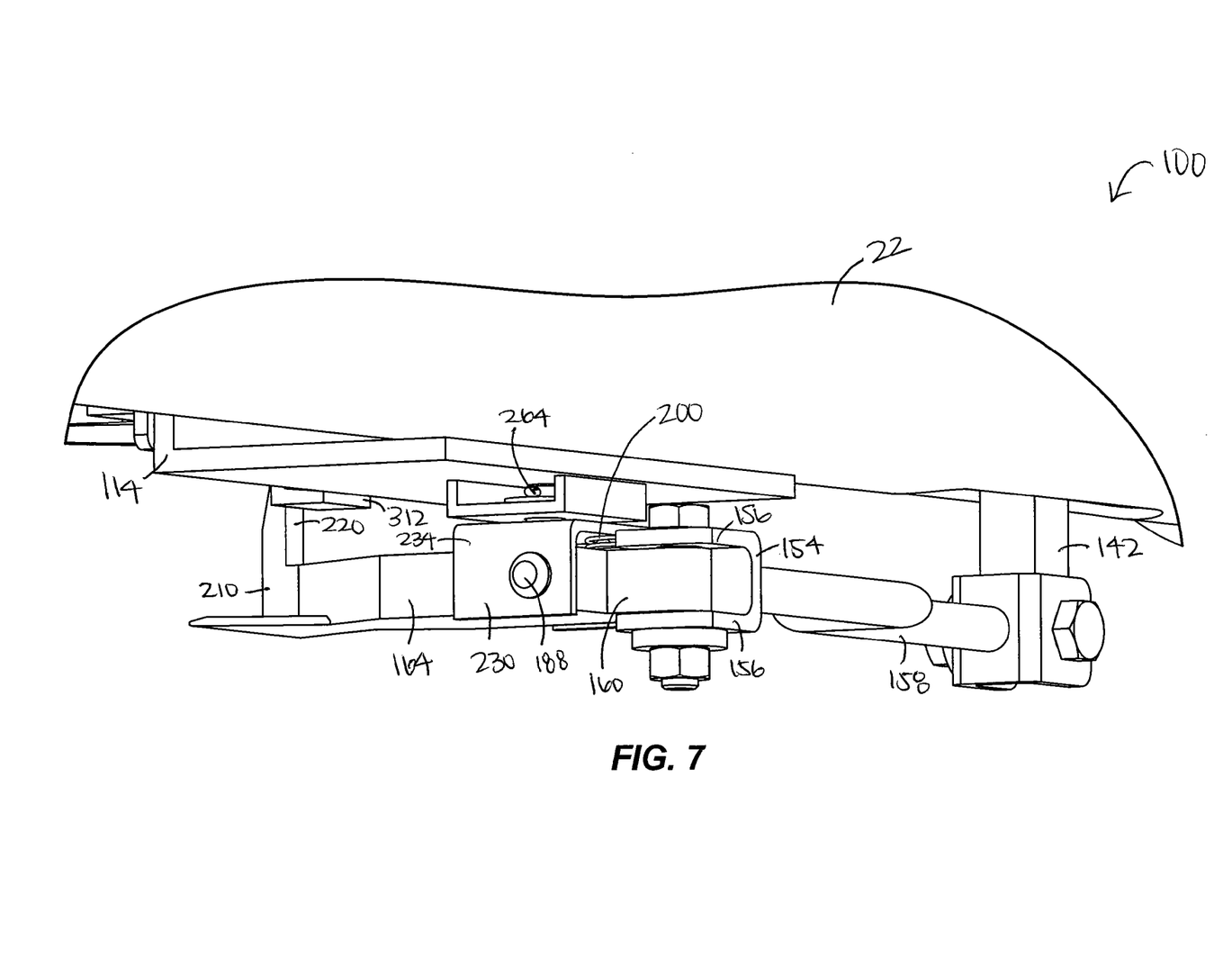
FIG. 7 is a rear perspective view of another portion of the automatic lift mechanism of FIG. 2.

Referring to FIGS. 2-5, an actuating pin 142 coupled to the sliding member 120 protrudes through access slots 146a, 146b in the underside of the slide bearing support 130 and drawbar tube 22, respectively. The actuating pin 142 is fixedly coupled to a link rod assembly 150 extending distally to a bracket member 154. Referring also to FIGS. 6 and 7, the bracket member 154 has first and second walls 156 that sandwich and pivotally couple an end portion 160 of a latch member 164, further described below. The link rod assembly 150 includes an offset portion 158 between the pin 142 and the bracket member 154. In some applications, the link rod assembly is replaced with one or more flexible cables (not shown). Such an alternative may be suitable for a variable height drawbar in which the relationship between the sliding member 120 and the jockey wheel 30 is not fixed.

Figures 8, 9:
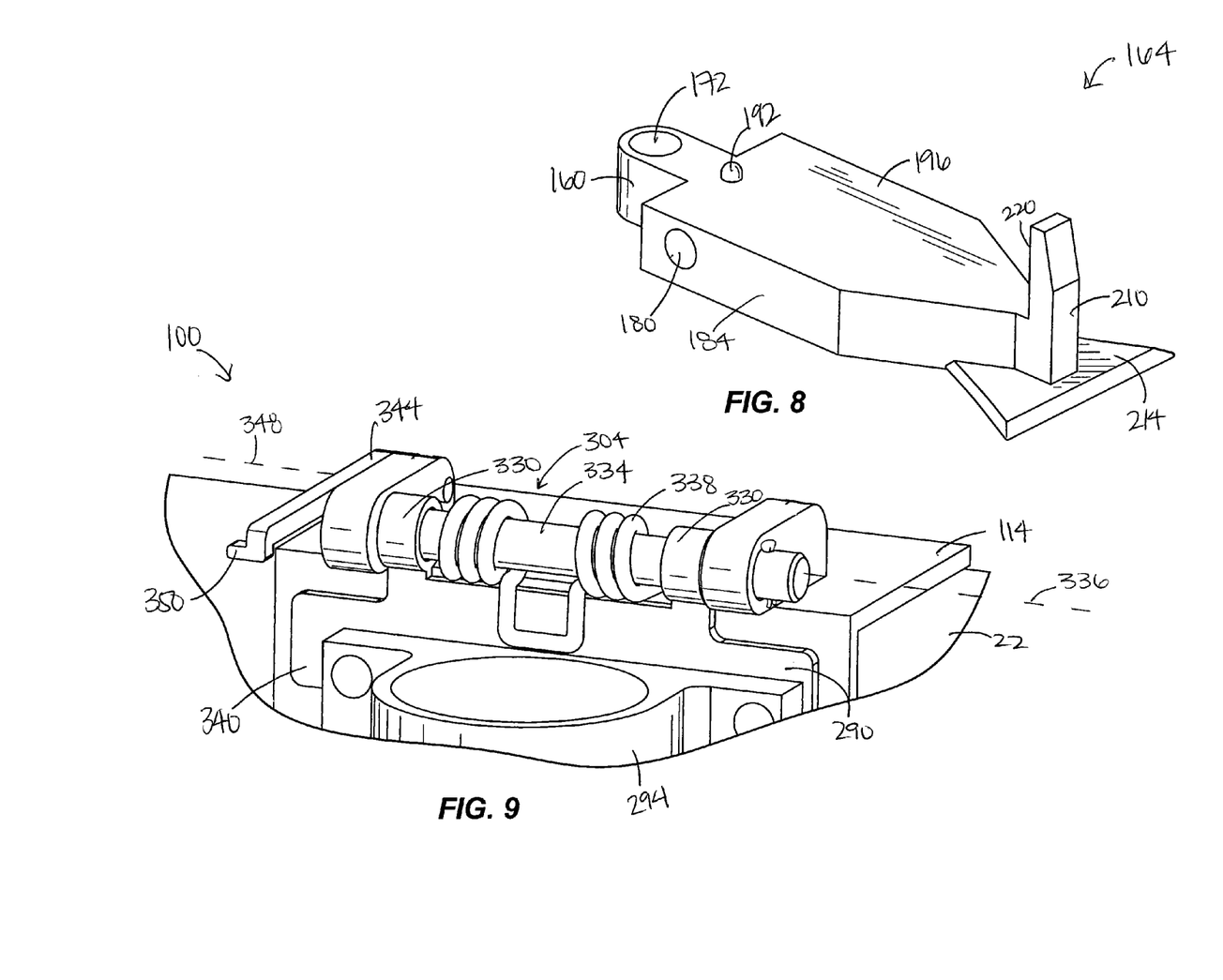
FIG. 8 is a perspective view of a latch member.
FIG. 9 is a perspective view of a portion of the automatic lift mechanism of FIG. 2

Referring also to FIG. 8, the arcuate end portion 160 of the latch member 164 defines a first through-hole or aperture 172 configured to receive a link 176 rotatably coupled to the bracket member 154. A second through-hole or aperture 180 extends through the body 184 of the latch member 164 and is adapted to receive a fastener or pin 188 therethrough. A protrusion 192 on a top surface 196 engages a first end of a spring 200. A projecting arm 210 extends from a plate member 214 opposite the end portion 160 and includes an engagement surface 220 generally orthogonal to the top surface 196.

With reference to FIGS. 3 and 5-8, the pin 188 extends through the aperture 180 and is rotatably fastened to the opposing arms 230 of a pivoting bracket 234. The top portion 238 of the bracket 234 connecting the opposing arms 230 includes a centrally located aperture 242 aligned with a corresponding aperture 246 of a mounting bracket 250 secured to the underside 254 of the lifting mechanism body 114. A mounting pin 260 extends through apertures 242, 246 and includes sets of opposing protrusions 264 at each end. A washer or similar member 272, either fixed or movable relative to the pin 260 is disposed inwardly of each of the sets 264 to concurrently retain the mounting pin 260 within the bracket 234 and the bracket 234 adjacent to the bracket 250, respectively, while permitting relative rotation therebetween. Accordingly, the latch member 164 is continuously pivotable between first and second positions.

As illustrated in FIG. 8, the protrusion 192 is offset from the latch member pivoting axis, permitting the spring 200, positioned between the top surface 196 and the top portion 238 of the pivoting bracket 234, to bias the latch member 164 about the pin 188 upward for latching, as will be further explained.

Referring again to FIGS. 2-3, the jockey wheel 30 is coupled to a back plate 290 with a mounting device, such as a clamp 294 that permits vertical adjustment of the jockey wheel 30 during normal operation. The clamp 294 can be an existing clamp known to those of skill in the art or an alternative securing device that is integrally formed with the back plate 290. The back plate 290 includes a first end 300 and a second end 304. The first end 300 includes an extension 308 with an orthogonal ledge or projection 312. The engagement surface 220 of the projecting arm 210 of the latch member 164 is configured to cooperate with a surface 324 of the extension 308.

The second end 304 of the back plate is illustrated in greater detail in FIG. 9. The second end 304 of the back plate 290 includes a plurality of integrated hinge members 330 through which a pivot pin 334 is received to rotatably couple the back plate 290 to the lift mechanism body 114. The back plate 290 is rotatable relative to the lift mechanism body 114 about an axis 336 generally parallel to the longitudinal axis 24 of the drawbar tube 22. In other applications in which the body 114 is not necessarily coupled to the drawbar tube 22, the axis 336 may not be parallel to the longitudinal axis 24. The back plate 290 is biased toward a substantially horizontal position by a spring 338, such as a torsion spring. In some applications, the back plate 290 can be biased toward another position not substantially horizontal, for example, toward a position from approximately 45° to approximately 60° from a vertical orientation. The projection 312 of the back plate 290 engages with the lift mechanism body 114 to ensure adequate load transfer and minimize stresses on the spring-loaded pivot. The back plate 290 includes an additional proximally extending tab 340.

Figure 10A:
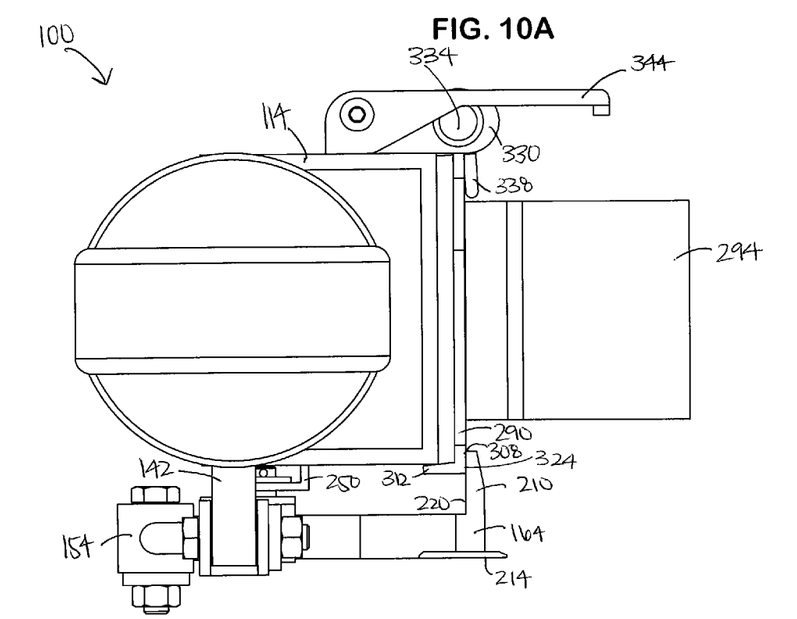
FIG. 10A is a front view of the automatic lift mechanism of FIG. 2 in a first position.
Figure 10B:
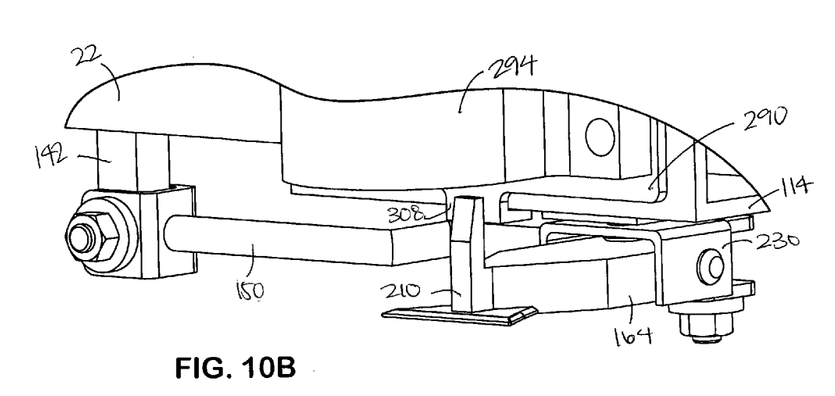
FIG. 10B is a perspective view of a portion of the automatic lift mechanism of FIG. 2 in the first position of FIG. 10A.
Figure 11A:
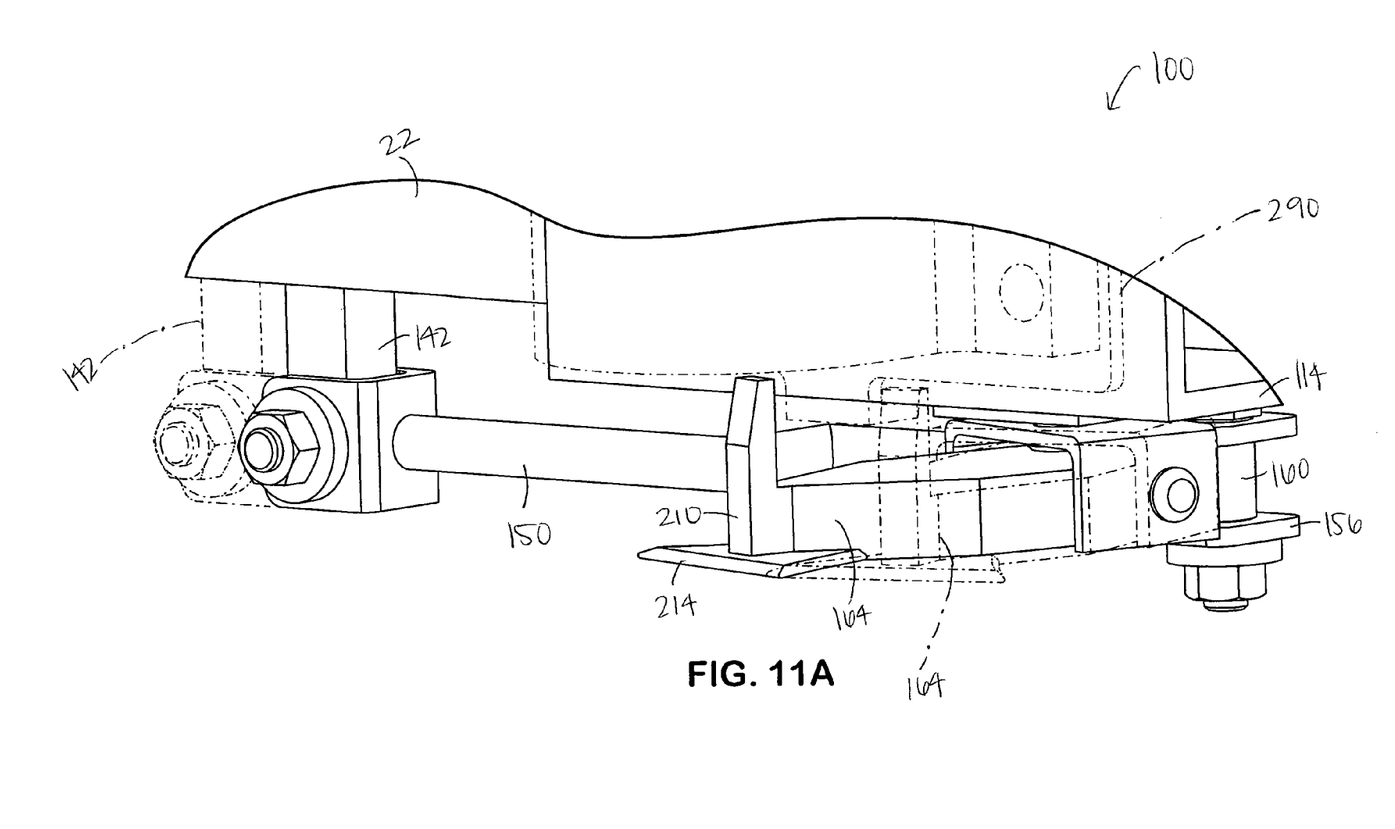
FIG. 11A is a perspective view of a portion of the automatic lift mechanism of FIG. 2 moving to a second position.

In operation, after the trailer 10 is attached by a coupling to the tow vehicle and with the back plate 290 retained against the biasing force of the spring 338 in a substantially vertical position by contact of surface 324 of the extension 308 with the engagement surface 220 of the arm 210 (FIGS. 10A and 10B), the vehicle moves initially forward or rearward in the normal course. In response to movement of the tow vehicle either forward or rearward, the sliding member 120 translates inside the drawbar tube 22 along the axis 24. The damper 136 aids in controlling the movement of the sliding member 120 by damping the acceleration and braking forces transmitted to the sliding member 120 by the vehicle and additionally reduces nuisance operation of the mechanism 100. The spring 138 further controls the transmission of force and permits axial movement of the slider member 120 in either the forward or rearward direction relative to the drawbar tube 22. For example, with forward motion of the vehicle, the sliding member 120, and in particular the flange 128, moves in the proximal direction (forward) along the axis 24 against the spring 138, resulting in relative movement of the attached actuating pin 142 with respect to the drawbar tube 22. As the link rod assembly 150 translates with the actuating pin 142, the interaction of the bracket member 154 with the latch member end portion 160 results in horizontal pivoting of the latch member 164 about the mounting pin 260, converting linear movement of the pin 142 to rotational movement of the latch member 164 (FIG. 11A). The offset 158 permits linear movement of the pin 142 to effect proper movement of the end portion 160, which may not necessarily be aligned with the translational motion of the pin 142.

Figure 11B:
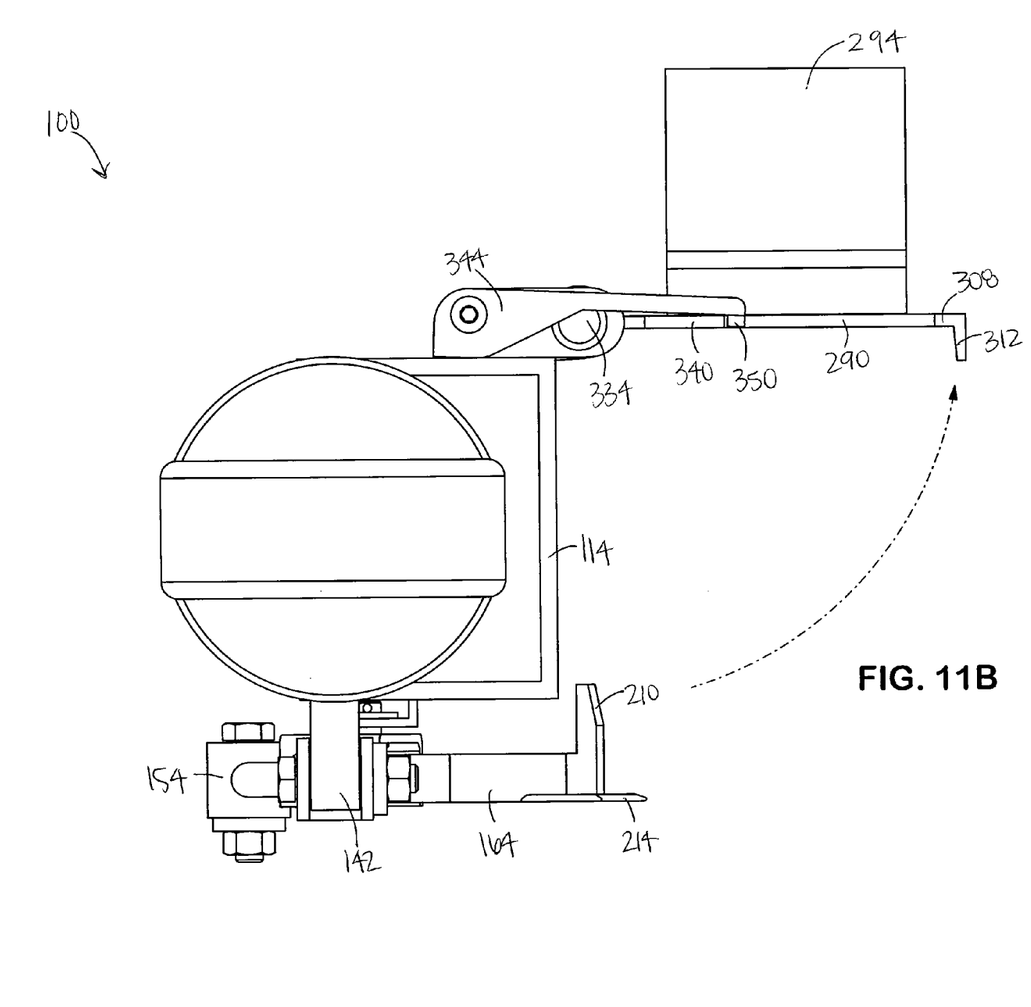
FIG. 11B is a front view of the automatic lift mechanism of FIG. 2 in the second position.

Referring to FIGS. 11A and 11B, rotation of the latch member 164 from the first position to the second position, in which the extension 308 is released from contact with the projecting arm 210, frees the spring 338 to rotate the back plate 290 upward approximately 90° about the axis 336, carrying the clamp 294 to a horizontal transit or otherwise stowed position.

The automatic lift mechanism 100 additionally includes an auxiliary bar 344 (FIGS. 2-3, 9, 10A, and 11A), which interacts with the tab 340 of the back plate 290. The bar 344 is rotatably coupled to the body 114 at a point behind (i.e., towards the longitudinal axis 24 of the drawbar tube 22) the hinge members 330 and pivotable about an axis 348 approximately 15-20° on either side of a horizontal position. The axis 348 is parallel to and offset from the axis 336 and the bar 344 rotates along an offset arc of a different radius than the arc defined by rotation of the back plate 290. The bar 344 further includes a proximally projecting ledge 350.

In operation, interference between the tab 340 and the bar 344 when the back plate 290 rotates to the horizontal position moves the bar 344 to a substantially horizontal position. Because of the difference in arc paths between the bar 344 and back plate 290, downward movement of the plate 290 to the vertical position, e.g., due to road vibrations, is limited by the arc path intersection between the tab 340 and the ledge 350, thereby limiting unwanted motion of the back plate 290 due to external driving conditions and assisting the spring 338 in retaining the back plate 290 when in the horizontal position. When the towing vehicle stops and the trailer 10 is to be unhitched, the operator manually lifts the bar 344, freeing the back plate 290 to be rotated back into the first vertical position. Depressing the plate member 214 against the spring 200 or rotating the plate member 214 such that the extension 308 can be repositioned against the biasing force of the spring 338 behind the projecting arm 210 and subsequently releasing the plate member 214 resets the mechanism 100 for further automatic or manual positioning of the jockey wheel 30.

In an alternative embodiment, the mechanism 100 can be adapted to raise the clamp 294 (and jockey wheel 30) vertically in a linear manner as opposed to pivotally through rotation. By modifying the projecting arm 210 to interact with the projection 312 and replacing the hinge members 330 and pin 334 with a sliding assembly, the back plate 290 can be manually forced downward and retained against a spring force, i.e., a compression spring, and released by the identical rotation of the latch member 164 initiated by movement of the sliding member 120 forward or rearward, as previously described.

In yet another alternative, the mechanism 100 is electrically operable, wherein movement of the sliding component 120 directly or indirectly operates a switch that actuates a motor to raise and lower the back plate 290. In each case, initiation of movement of the towing vehicle forward or rearward automatically raises the jockey wheel into the transit position.

The mechanism 100 is preferably made from metal, e.g., steel, and select components can be either clamped or welded to existing trailer frame members, or assembled as an integral system during trailer construction.

Various features and advantages of the invention are set forth in the following claims.

What is claimed is:

1. A device for lifting a drawbar support of a trailer for a vehicle, the trailer including a frame having a drawbar tube defining a longitudinal axis, the device comprising:
a sliding member receivable in the drawbar tube and configured for movement along the longitudinal axis in response to movement of the vehicle;
a body fixedly secured to the drawbar tube;
a back plate pivotally coupled to the body and rotatable relative to the body about an axis parallel to the longitudinal axis, the back plate biased toward a first position;
a mounting device secured to the back plate and configured to operatively couple the drawbar support to the back plate;
a latch member connected to the sliding member and pivotally coupled to the body, the latch member configured to rotate in response to movement of the sliding member from an engaged position, wherein the back plate is retained in a substantially vertical second position by the latch member, to a disengaged position wherein the back plate is free to rotate to the first position.

2. The device of claim 1, further comprising a link rod assembly coupled between the latch member and the sliding member, the link rod assembly including an actuation pin secured to the sliding member and extending through a slot in the drawbar tube.

3. The device of claim 1, wherein when the latch member is in the engaged position, a projection of the latch member engages the back plate to secure the back plate in the substantially vertical second position.

4. The device of claim 3, wherein when the latch member is in the disengaged position, the projection of the latch member does not engage the back plate such that the back plate is free to rotate to the first position.

5. The device of claim 3, further comprising a biasing mechanism operatively engaged to the back plate to bias the back plate toward the first position.

6. The device of claim 1, further including a biasing member operatively engaged with the sliding member to bias the sliding member, with respect to the drawbar tube, along the longitudinal axis toward the frame.

7. The device of claim 1, wherein the body is coupled to an exterior surface of the drawbar tube.

8. The device of claim 1, further including a drawbar support releasably secured to the mounting device.

9. The device of claim 1, wherein the sliding member is responsive to movement of the vehicle along the longitudinal axis toward or away from the frame.

10. The device of claim 1, wherein the latch member is manually depressible to move the drawbar support from the second position to the first position.

11. A trailer adapted to be coupled to a tow vehicle, the trailer comprising:
a frame including a drawbar tube defining a longitudinal axis;
a drawbar support pivotally coupled to the drawbar tube and rotatable relative to the drawbar tube about an axis parallel to the longitudinal axis, the drawbar support biased toward a substantially horizontal orientation;
a sliding member receivable in the drawbar tube and configured for movement along the longitudinal axis in response to movement of the tow vehicle;
a latch member connected to the sliding member, the latch member configured to move in response to movement of the sliding member from a first position, wherein the drawbar support is retained in a substantially vertical orientation by the latch member, to a second position wherein the drawbar support is free to rotate toward the substantially horizontal orientation.

12. The trailer of claim 11, further comprising a link rod assembly coupled between the latch member and the sliding member, the link rod assembly including an actuation pin extending through a slot in the drawbar tube.

13. The trailer of claim 11, further including a biasing member operatively engaged with the sliding member to bias the sliding member, with respect to the drawbar tube, along the longitudinal axis toward the frame.

14. The trailer of claim 11, further comprising a back plate secured to the drawbar tube and configured to operatively couple the drawbar support to the drawbar tube.

15. The trailer of claim 11, wherein the drawbar support is in the form of a jockey wheel.

16. The trailer of claim 11, wherein the sliding member is responsive to movement of the tow vehicle along the longitudinal axis toward or away from the frame.

* * * * *